(12) United States Patent
Suganuma et al.

(10) Patent No.: US 7,539,679 B2
(45) Date of Patent: May 26, 2009

(54) INFORMATION PROCESSING SYSTEM AND CONTROL

(75) Inventors: Toshio Suganuma, Yokohama (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/294,238

(22) Filed: Dec. 5, 2005

(65) Prior Publication Data

US 2006/0122960 A1  Jun. 8, 2006

(30) Foreign Application Priority Data

Dec. 3, 2004  (JP) ............................. 2004-351492

(51) Int. Cl.
*G06F 17/30* (2006.01)

(52) U.S. Cl. .......................................... 707/8; 711/143

(58) Field of Classification Search ................ 718/101; 707/8; 711/143
See application file for complete search history.

(56) References Cited

U.S. PATENT DOCUMENTS

| | | | | |
|---|---|---|---|---|
| 5,212,789 | A * | 5/1993 | Rago | 707/8 |
| 5,465,352 | A * | 11/1995 | Nakazawa et al. | 707/3 |
| 5,561,763 | A * | 10/1996 | Eto et al. | 714/35 |
| 5,581,749 | A * | 12/1996 | Hossain et al. | 707/10 |
| 5,832,519 | A * | 11/1998 | Bowen et al. | 707/203 |
| 5,893,113 | A * | 4/1999 | McGrath et al. | 707/200 |
| 6,026,406 | A * | 2/2000 | Huang et al. | 707/100 |
| 6,226,634 | B1 * | 5/2001 | Ogihara et al. | 707/4 |
| 6,834,275 | B2 * | 12/2004 | Kanai et al. | 707/1 |
| 2002/0198883 | A1 * | 12/2002 | Nishizawa et al. | 707/1 |
| 2003/0177146 | A1 * | 9/2003 | Zimowski | 707/200 |
| 2003/0217033 | A1 * | 11/2003 | Sandler et al. | 707/1 |
| 2004/0044642 | A1 * | 3/2004 | Fujii et al. | 707/1 |
| 2004/0078398 | A1 * | 4/2004 | Chiang et al. | 707/204 |
| 2004/0123048 | A1 * | 6/2004 | Mullins et al. | 711/141 |
| 2004/0148420 | A1 * | 7/2004 | Hinshaw et al. | 709/231 |
| 2004/0205110 | A1 * | 10/2004 | Hinshaw | 709/201 |
| 2005/0065626 | A1 * | 3/2005 | Kappelhoff et al. | 700/97 |
| 2005/0102254 | A1 * | 5/2005 | Marr et al. | 707/1 |

(Continued)

OTHER PUBLICATIONS

Bayer, Rudolf. "Consistency of transactions and random batch", Dec. 1986, ACM Transactions on Database Systems (TODS), vol. 11 Issue 4.*

(Continued)

*Primary Examiner*—Christian P. Chace
*Assistant Examiner*—Tarek Chbouki
(74) *Attorney, Agent, or Firm*—Vazken Alexanian

(57) ABSTRACT

Provides methods, apparatus and systems to speed up transaction processing against a database. An example information processing system for performing transaction processing against a database includes: a processing program acquiring section for acquiring a processing program in which the transaction processing against a database is described; a target data selection section for selecting from the database at least one target data to be accessed by the transaction processing of the processing program; and a write[-]back processing insertion section for inserting target[-]data write[-]back processing for writing back target data which has been updated by the transaction processing among the target data, into a part of the processing program which is to be executed after the target data is accessed last and before a result of the transaction processing is committed.

2 Claims, 14 Drawing Sheets

U.S. PATENT DOCUMENTS

2005/0160315 A1* 7/2005 Chandrasekaran et al. .... 714/15
2005/0183057 A1* 8/2005 Barghouthi et al. ......... 717/100
2006/0074970 A1* 4/2006 Narayanan et al. .......... 707/102
2007/0043531 A1* 2/2007 Kosche et al. ............... 702/182

OTHER PUBLICATIONS

High Speed Function of Batch Processing by Vitualizing Input/output and Parallel Execution: PREST Journal of Information Processing Society of Japan, vol. 35, No. 5 (May 1994).

* cited by examiner

[Figure 1]
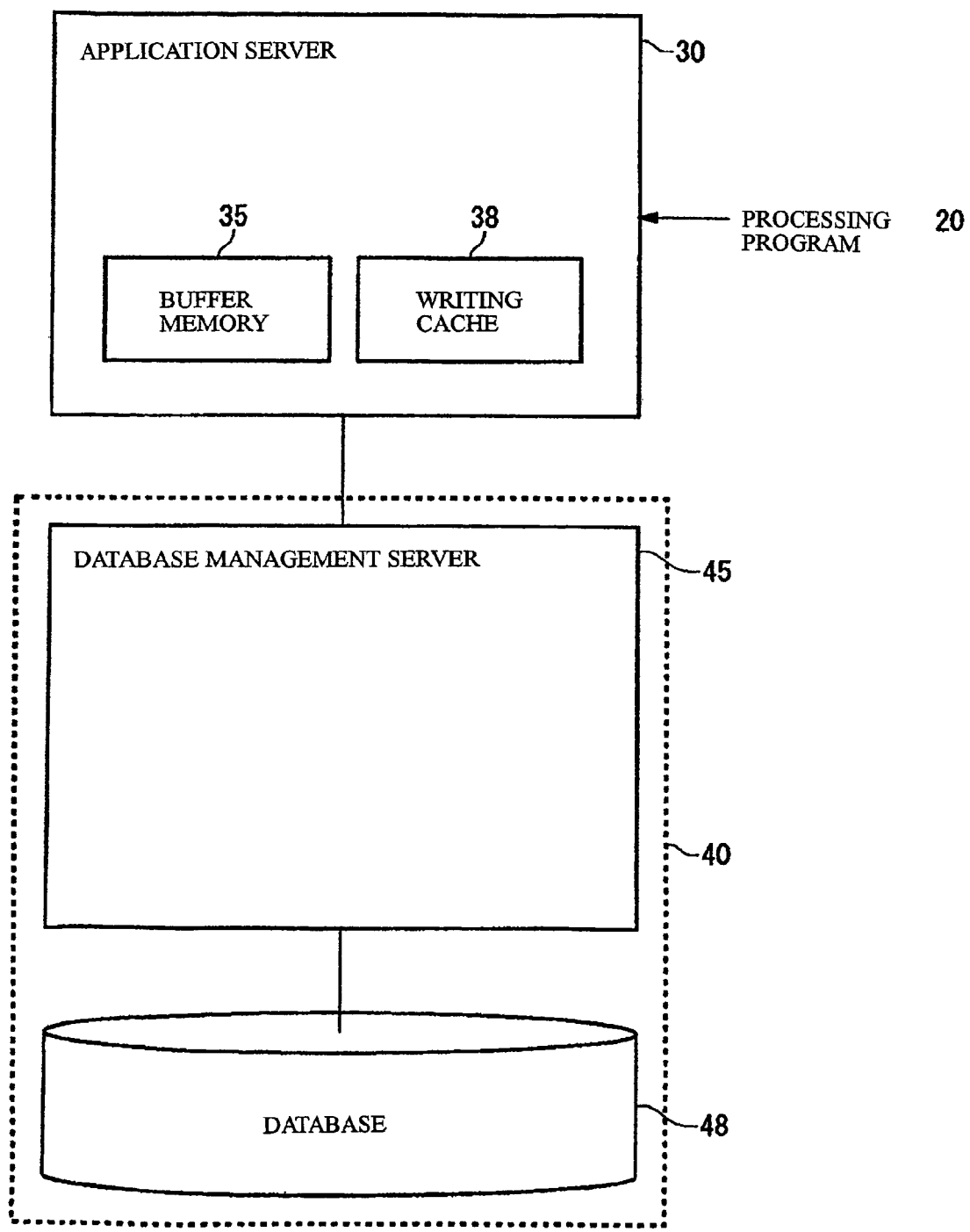

[Figure 2]

```
 1:batchMain() {
 2:    /* open batch input/output stream, create batch session bean, etc. */
 3:    initializeBatchEnvironment();
 4:
 5:    /* get input data */
 6:    input = inputStream.getMessage();
 7:
 8:    /* batch outer loop */
 9:    for ( ; input != null; ) {
10:        /* begin a new transaction */
11:        userTransaction.begin();
12:
13:        /* batch inner loop (for checkpoint interval) */
14:        for ( ; ShouldCheckpointBeExecuted(); ) {
15:            /* execute a batch job */
16:            account.creditAccount(input.accountNum, input.amount);
17:            /* get next input data */
18:            input = inputStream.getMessage();
19:        }
20:        /* call a container service for check pointing */
21:        bc.applyCheckpointPolicy();
22:        /* commit the current transaction */
23:        userTransaction.commit();
24:    }
25:    /* cleanup batch processing environment */
26:    destroyBatchEnvironment();
27:}
```

20

[Figure 3]
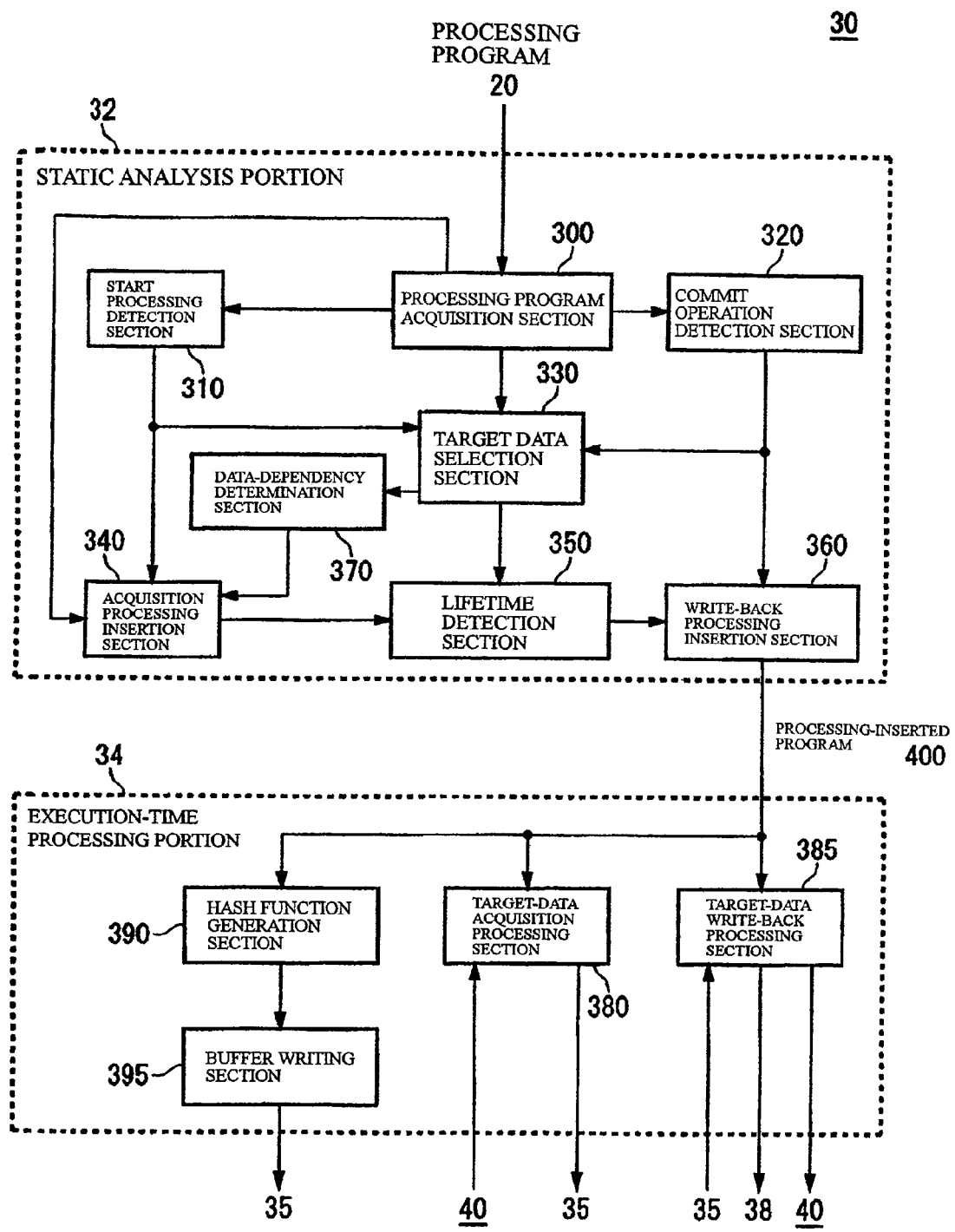

```
 1: batchMain() {
 2:     /* open batch input/output stream, create batch session bean, etc. */
 3:     initializeBatchEnvironment();
 4:
 5:     /* get input data */
 6:     input = inputStream.getMessage();
 7:
 8:     /* batch outer loop */
 9:     for ( ; input != null; ) {
10:         /* begin a new transaction */
11:         userTransaction.begin();
12:         CALLS TARGET-DATA ACQUISITION PROCESSING
13:         /* batch inner loop (for checkpoint interval) */
14:         for ( ; ShouldCheckpointBeExecuted(); ) {
15:             /* execute a batch job */
16:             account.creditAccount(input.accountNum, input.amount);
17:             /* get next input data */
18:             input = inputStream.getMessage();
19:         }
20:         /* call a container service for check pointing */
21:         bc.applyCheckpointPolicy();
22:         CALLS TARGET-DATA WRITE-BACK PROCESSING
23:         userTransaction.commit();
24:     }
25:     /* cleanup batch processing environment */
26:     destroyBatchEnvironment();
27: }
```

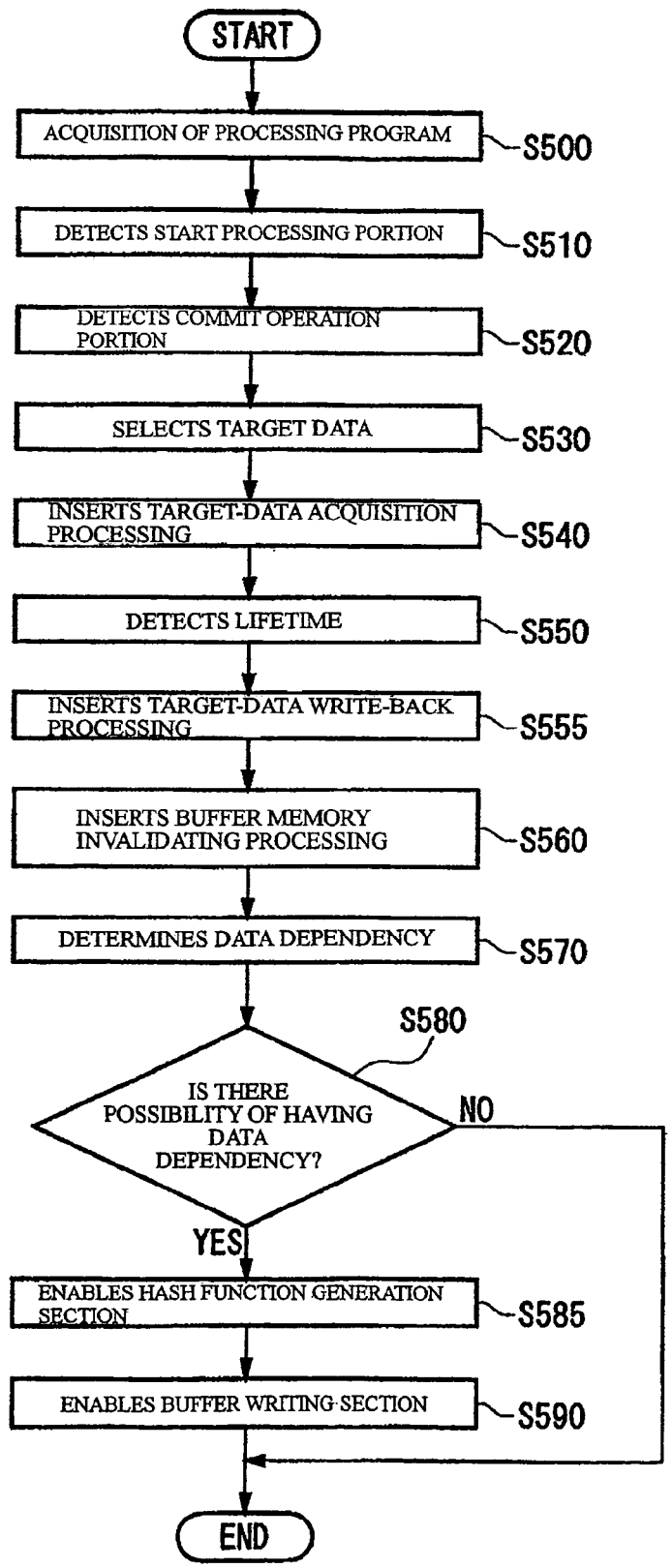
[Figure 5]

[Figure 6]
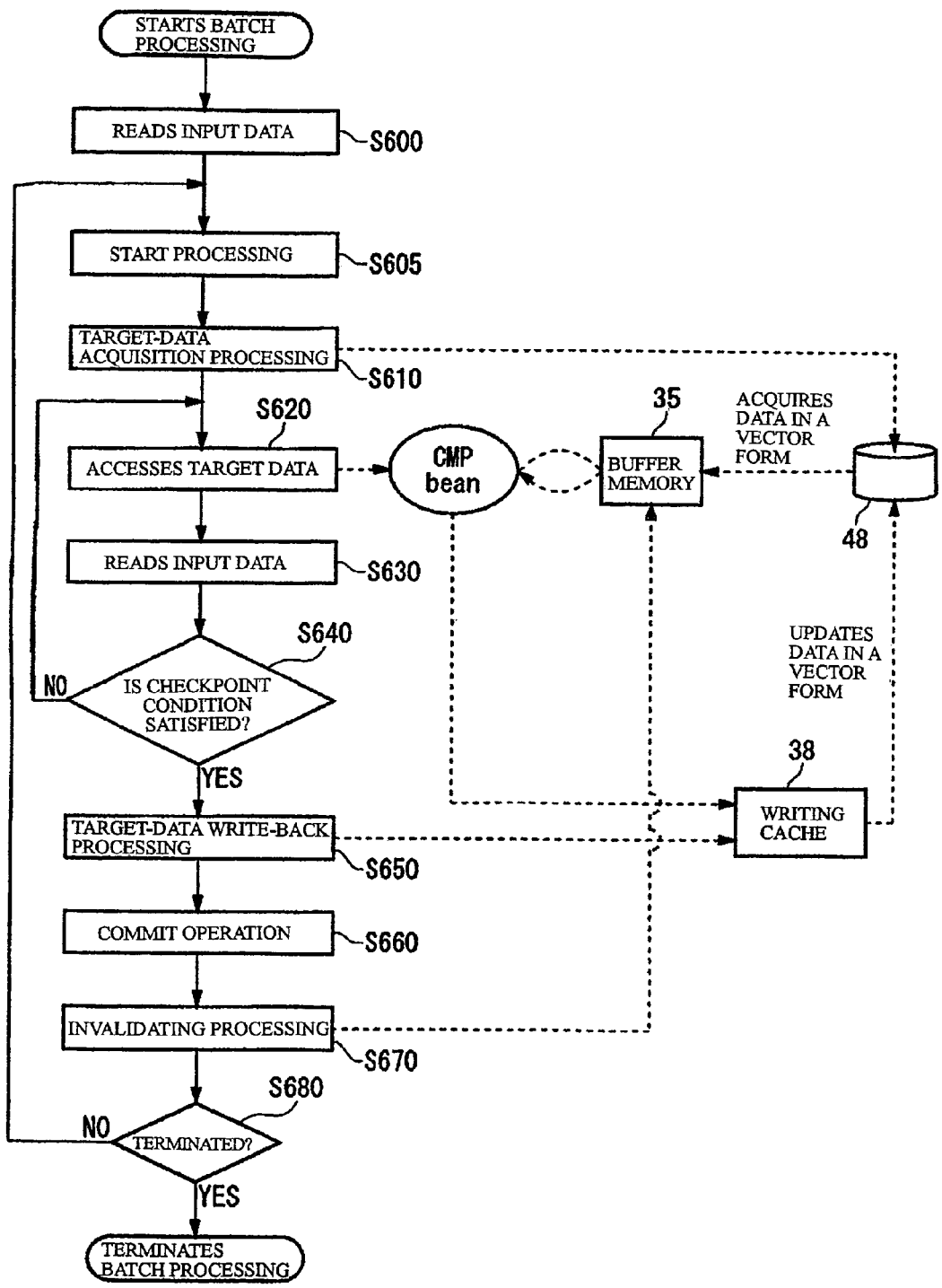

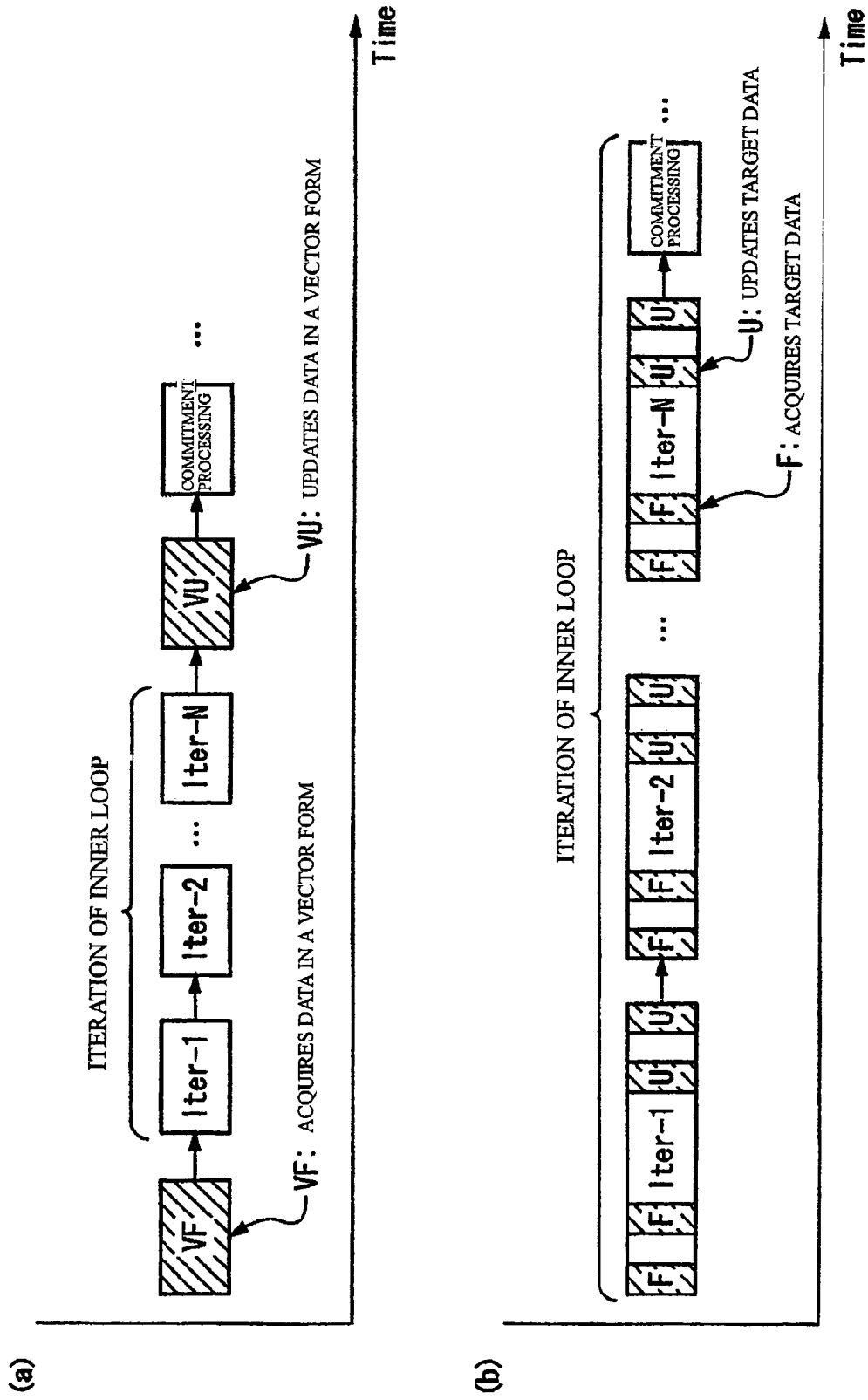
[Figure 7]

```
1: batchMain () {
2:      /* get input data */
3:      input = inputstream.getMessage();
4:
5:      /* batch outer loop */
6:      for ( ; input != null; ) {
7:          /* begin a new transaction */
8:          userTransaction.begin();
9:
10:         /* batch inner loop (for checkpoint interval) */
11:         for ( ; ShouldCheckpointBeExecuted(); ) {
12:             /* get account A and account B */
13:             accountA = account_home.findByPrimaryKey(input.customerAId);
14:             accountB = account_home.findByPrimaryKey(input.customerBId);
15:             /* update balance data in account A and account B */
16:             accountA.setBalance(accountA.getBalance() - input.amount);
17:             accountB.setBalance(accountB.getBalance() + input.amount);
18:             /* get next input data */
19:             input = inputStream.getMessage();
20:         }
21:         /* call a container service for check pointing */
22:         bc.applyCheckpointPolicy();
23:         /* commit the current transaction */
24:         userTransaction.commit();
25:     }
26: }
```

(b)

INPUT DATA :

| customerAId | customerBId | amount |
|---|---|---|
| 0503 | 0505 | 150 |
| 0504 | 0438 | 250 |
| 0505 | 0215 | 75 |

[Figure 9]

```
1: batchMain () {
2:     /* get input data */
3:     input = inputStream.getMessage();
4:
5:     /* batch outer loop */
6:     for ( ; input != null; ) {
7:         /* begin a new transaction */
8:         userTransaction.begin();
9:         CALLS TARGET-DATA ACQUISITION PROCESSING
10:        /* batch inner loop (for checkpoint interval) */
11:        for ( ; ShouldCheckpointBeExecuted(); ) {
12:            /* get account A and account B */
13:            accountA = account_home.findByPrimaryKey(input.customerAId);
14:            accountB = account_home.findByPrimaryKey(input.customerBId);
15:            /* update balance data in account A and account B */
16:            accountA.setBalance(accountA.getBalance() - input.amount);
17:            accountB.setBalance(accountB.getBalance() + input.amount);
18:            /* get next input data */
19:            input = inputStream.getMessage();
20:        }
21:        /* call a container service for check pointing */
22:        bc.applyCheckpointPolicy();
23:        CALLS TARGET-DATA WRITE-BACK PROCESSING
24:        userTransaction.commit();
25:    }
26: }
```

[Figure 10]
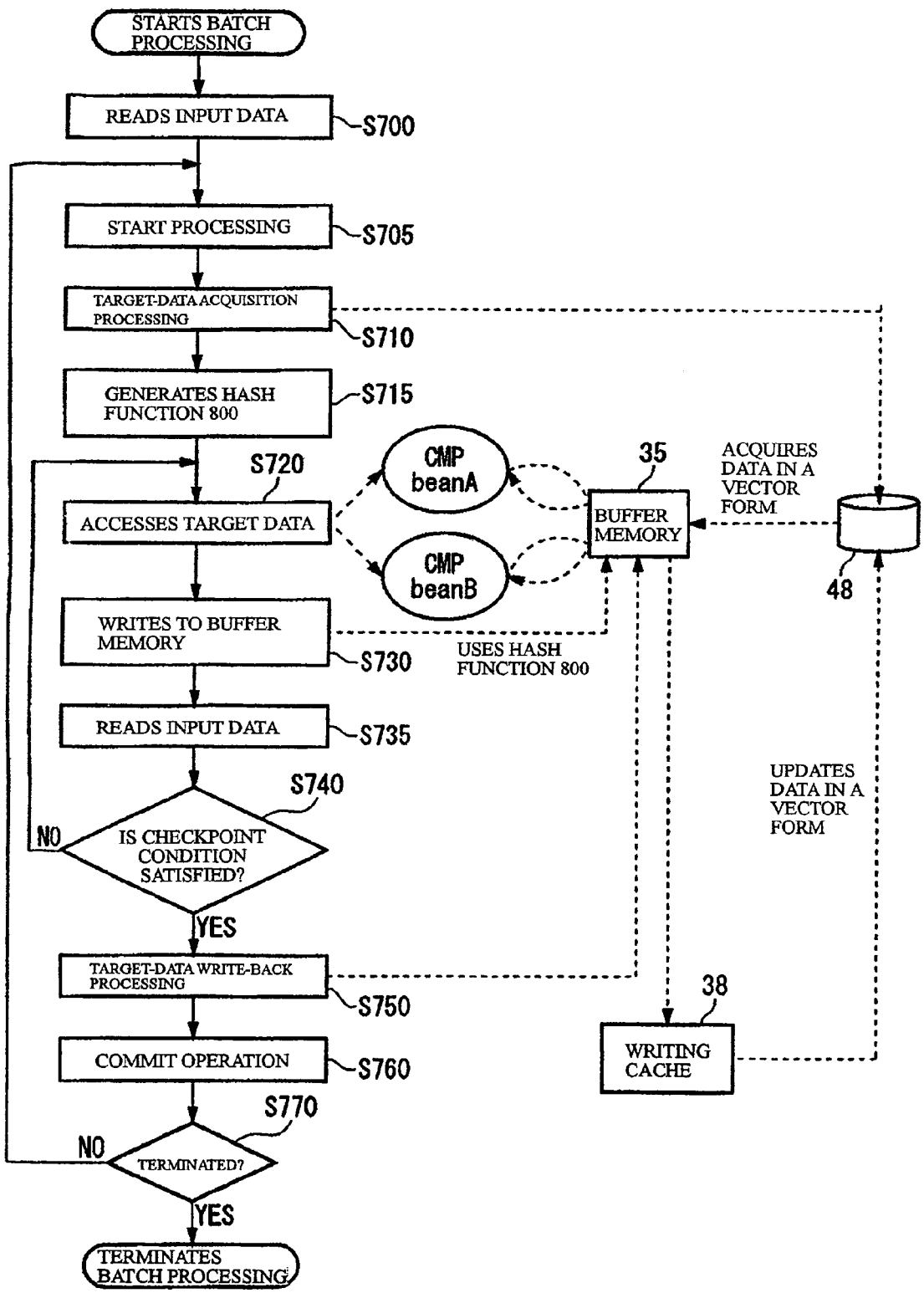

[Figure 11]
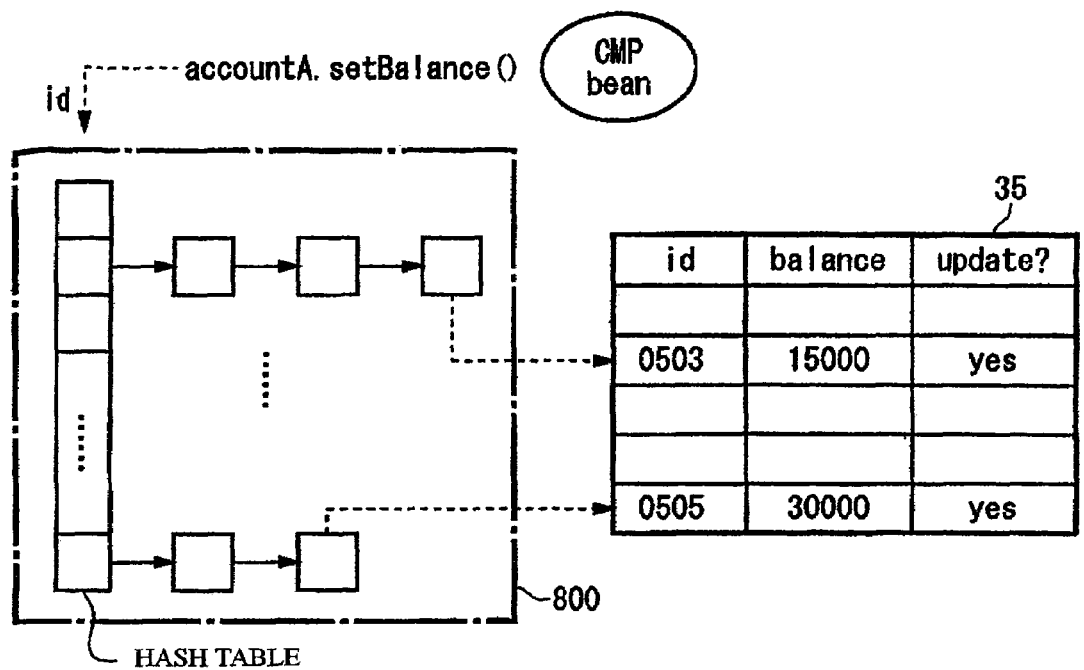

[Figure 12]
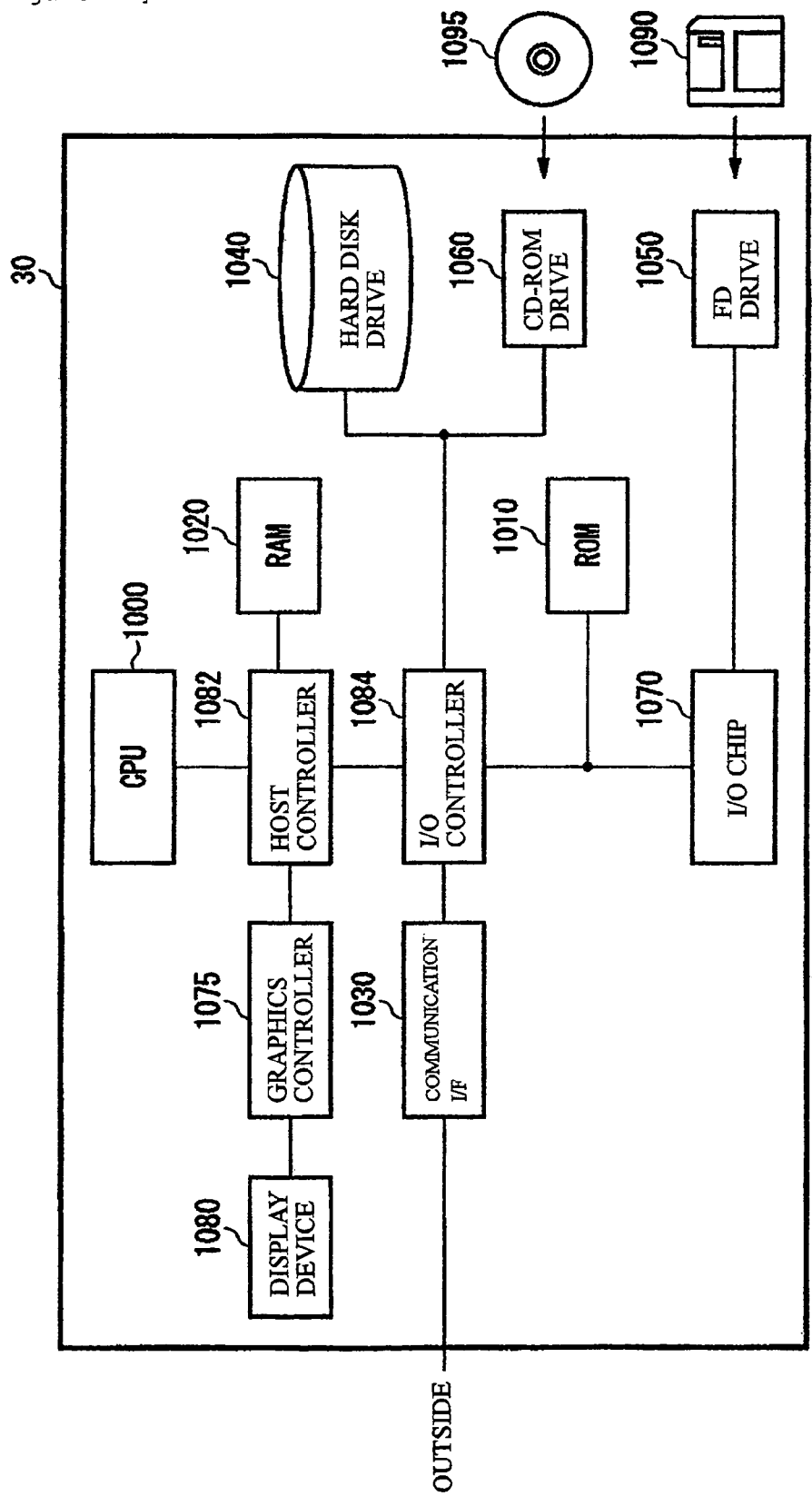

[Figure 13]
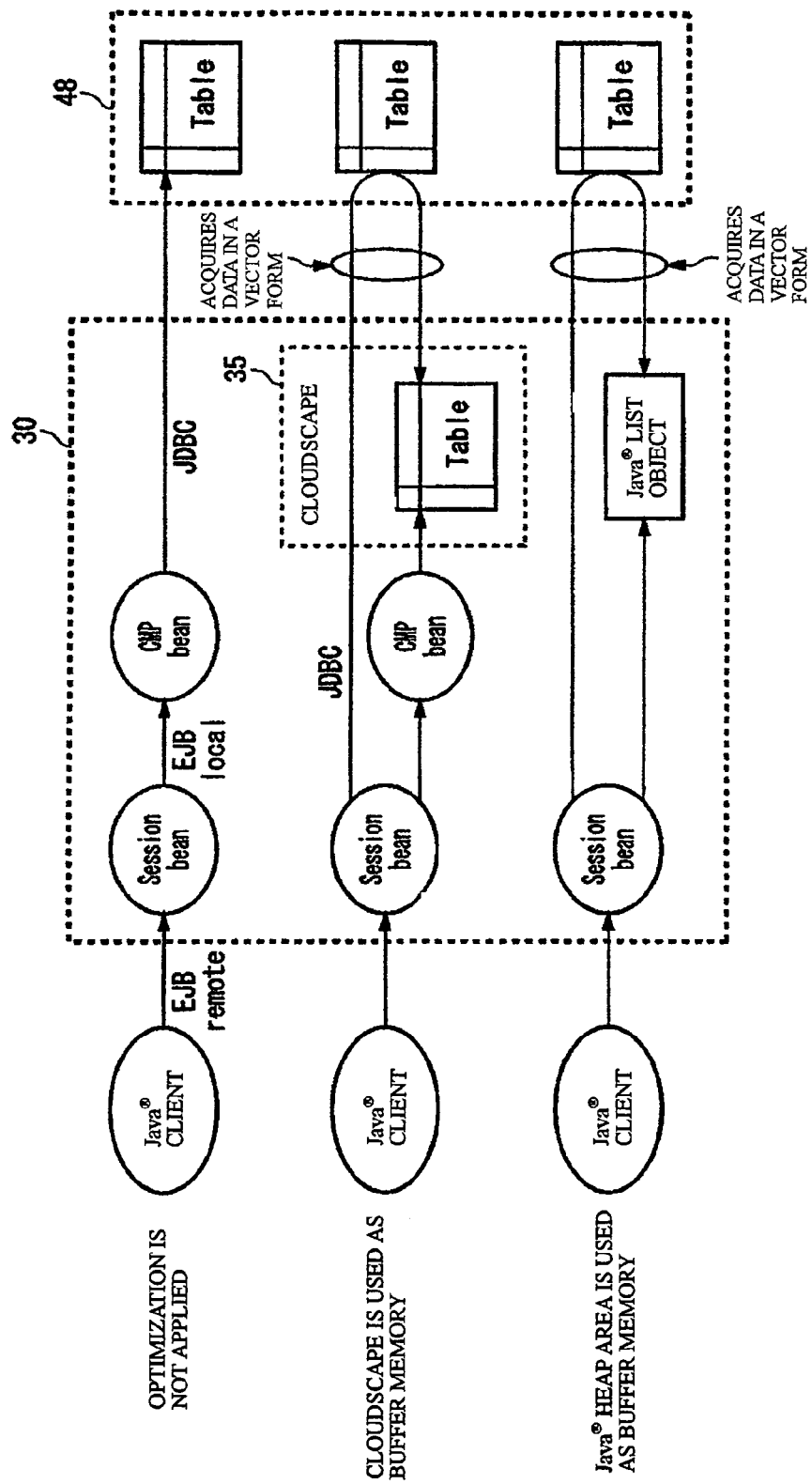

```
 1:home = ctxt.lookup("java:comp/env/ejb/CloudscapeAccount");
 2:stmt1 = prepareStatement( "select * from table where id >= 0" );
 3:stmt2 = prepareStatement( "update table balance ? where id=?" );
 4:
 5:// batch outer loop
 6:for (int i = 0; i < 500; i++) {
 7:    start timer;
 8:    userTransaction.begin();
 9:    // prefetch data from backend RDB
10:    result = stmt1.executeQuery();
11:    // cache table replacement is performed here
12:
13:    // batch inner loop
14:    for (int j = 0; j < 500; j++) {
15:        // access data from cache
16:        account = home.findByPrimaryKey(new Integer(j));
17:        // do some batch job
18:        new_balance = account.getBalance() ......
19:        // directly update backend DB
20:        stmt2.setDouble(1, new_balance); stmt2.setInt(2, j);
21:        stmt2.addBatch();
22:    }
23:    // do check pointing
24:    stmt2.executeBatch();
25:    userTransaction.commit();
26:    stop timer;
27:}
```

INFORMATION PROCESSING SYSTEM AND CONTROL

FIELD OF THE INVENTION

The present invention relates to an information processing system, a control method, and a program. In particular, the present invention relates to an information processing system, a control method, and a program for performing transaction processing against a database.

BACKGROUND ART

Recently, batch processing which has been conventionally performed by a large sized general purpose computer such as a mainframe is increasingly realized on a J2EE system such as a Web Application Server (WAS). J2EE (Java® 2 Enterprise Edition) is one of feature sets of "Java® 2", a programming language by Sun Microsystems, Inc., in which features required for a server used in a business system for industries or used for electronic commerce are integrated. By utilizing J2EE, the feature set provided with J2EE can be utilized and combined in the development process, and thereby system advantages of low development cost and high reliability can be obtained.

Batch processing is a process in which a sequence of processing steps of reading input data from a specified input stream, executing the logic of an application program based on the input data, and outputting the execution result to an output stream is repeated for a large amount of data. In the case of executing such batch processing on a J2EE system, the execution performance has sometimes been a problem. For example, if, every time data is required for batch processing, the data is acquired from a database; the database has to be accessed very frequently, which may be inefficient.

The following document is considered:
[Non Patent Document 1 Journal of Information Processing Society of Japan, Vol. 35, No. 5 (May 1994)

Conventionally, in order to cope with this, a developer of an application program has manually optimized batch processing by understanding the nature of the application program. For example, by describing in a program a code for collectively acquiring data required for batch processing in advance before the processing, processing efficiency is improved. As a related technique, there is a proposed technique for automatically improving efficiency of batch processing to some extent (see Non Patent Document 1). According to the technique and the related technique described above, it is possible to improve efficiency of sending/receiving data among multiple jobs or job steps included in batch processing.

Still another related technique has been used in a compiler for a vector processor. This compiler first determines data dependency of a program to be compiled, which is the dependency of the program on updated data during the execution of the processing. If there is no such data dependency, the compiler generates codes for reading continuous data in memory collectively to a vector register by using a vector load/store instruction. According to this technique, it is possible to reduce the frequency of reading data from memory and improve the processing efficiency of a program.

The present invention is intended to solve problems with the previous techniques. For example, there are limitations to manually optimize batch processing as described above, because developers have to make efforts to perform optimization for each application program. The objective of the technique of Non patent Document 1 is to optimize input/output relations among multiple jobs in batch processing, and it is not possible to improve efficiency of a single batch job. Furthermore, though a dynamic buffer checking mechanism with the use of input/output jobs is proposed in this technique, this mechanism cannot control what data should be stored in a buffer at what timing.

The approach used in a compiler for a vector processor can be considered to be applicable to a database transaction by regarding a main memory of a computer as a database and CPU registers as a buffer memory. However, contents of a database must be updated every time commitment operation is performed, and this timing is different from the data update timing of the main memory. Therefore, this approach cannot be immediately applied to a database transaction.

Furthermore, this technique assumes that it is possible to completely analyze a target program (such as that the program has a Do All loop) and determine that it does not have data dependency. Therefore, in programming languages which has recently gained popularity, such as Java®, the technique is often not applicable because it is very difficult to statically perform complete analysis for such programs. For example, in special method invocations (specifically, invokevirtual or invokeinterface) in Java®, any one method determined at runtime is selected to call among multiple predefined methods. Therefore, it is impossible to statically determine which method will be invoked, and thus impossible to determine the data dependency.

SUMMARY OF THE INVENTION

Accordingly, the present invention provides information processing systems, control methods and programs capable of solving the above problems. This is achieved by a combination of characteristics described in the independent Claims in the Claims. The dependent claims specify specific and further advantageous examples of the present invention.

In order to solve the above problems, in a first embodiment of the present invention, there are provided an information processing system for performing transaction processing against a database, the information processing system comprising: a processing program acquisition section for acquiring a processing program in which the transaction processing against a database is described; a target data selection section for selecting from the database at least one target data to be accessed by the transaction processing by the processing program; and a write back processing insertion section for inserting target data write back processing of writing back target data which has been updated by the transaction processing among the target data, into a part of the processing program which is to be executed after the target data is accessed last and before a processing result is committed; a method for controlling the information processing system and a program for controlling the information processing system. Thus, according to the present invention, it is possible to speed up transaction processing against a database.

The summary of the invention described above does not enumerate all the necessary characteristics of the present invention, and a sub combination of the characteristics can be the invention.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 1 shows the entire configuration of a batch processing system 10;

FIG. 2 shows an example of a processing program 20;

FIG. 3 shows the features of an application server 30 classified into functional blocks;

FIG. 4 shows an example of a processing inserted program 400;

FIG. 5 is a flowchart of a process to be statically performed by the application server 30 on the processing program 20;

FIG. 6 is a flowchart of a process to be performed by the application server 30 at execution time based on the processing inserted program 400;

FIG. 7 shows a timing chart of processing to be performed by the application server 30 at execution time based on the processing inserted program 400;

FIG. 8 shows another example of the processing program 20;

FIG. 9 shows the processing program 20 in which processing have been inserted;

FIG. 10 is a flowchart of a process to be performed by the application server 30 at execution time in this embodiment;

FIG. 11 shows the details of processing of the application server 30 manipulating target data with the use of the processing program acquisition section 300;

FIG. 12 shows an example of the hardware configuration of the application server 30;

FIG. 13 shows the outline of an experiment illustrating the effect of this embodiment; and FIG. 14 shows the processing program 20 used in the experiment illustrating the effect of this embodiment.

DESCRIPTION OF SYMBOLS

10 . . . Batch processing system
20 . . . Processing program
30 . . . Application server
32 . . . Static analysis portion
34 . . . Execution time processing portion
35 . . . Buffer memory
38 . . . Writing cache
40 . . . Database management system
45 . . . Database management server
48 . . . Database
300 . . . Processing program acquisition section
310 . . . Start processing detection section
320 . . . Commit operation detection section
330 . . . Target data selection section
340 . . . Acquisition processing insertion section
350 . . . Lifetime detection section
360 . . . Write back processing insertion section
370 . . . Data dependency determination section
380 . . . Target data acquisition processing section
385 . . . Target data write back processing section
390 . . . Hash function generation section
395 . . . Buffer writing section
400 . . . Processing inserted program
800 . . . Hash function

DETAILED DESCRIPTION OF THE INVENTION

The present invention provides information processing systems, control methods and programs capable of solving the above described problems. This is achieved by a combination of characteristics described in the independent Claims in the Claims. The dependent Claims specify specific and further advantageous examples of the present invention.

In an example embodiment of the present invention, there are provided an information processing system for performing transaction processing against a database, the information processing system comprising: a processing program acquisition section for acquiring a processing program in which the transaction processing against a database is described; a target data selection section for selecting from the database at least one target data to be accessed by the transaction processing by the processing program; and a write back processing insertion section for inserting target data write back processing of writing back target data which has been updated by the transaction processing among the target data, into a part of the processing program which is to be executed after the target data is accessed last and before a processing result is committed; a method for controlling the information processing system and a program for controlling the information processing system. Thus, with the present invention, it is possible to speed up transaction processing against a database.

The present invention will be described below through embodiments of the invention. However, the embodiments below do not limit the invention according to the Claims, and all in the combination of characteristics described in the embodiment are not necessarily required for solution means of the invention.

FIG. 1 shows the entire configuration of a batch processing system 10. The batch processing system 10 is provided with an application server 30 and a database management system 40. The application server 30 has a buffer memory 35 for caching at least a part of data in a database 48 and a writing cache 38 for tentatively storing data updated by transaction processing. The database management system 40 has a database management server 45 and the database 48.

The database management server 45 accesses the database 48 in response to an instruction received from the application server 30. The application server 30 is an example of an information processing system according to the present invention, and it is mounted with, for example, a virtual machine of J2EE (Java® 2 Enterprise Edition) and features of JDBC (Java® Database Connectivity) thereon. The application server 30 acquires a processing program 20, a Java® program in which transaction processing against the database 48 is described, and makes changes in the processing program 20 for speeding up the transaction processing. The application server 30 instructs the database management system 40 to perform transaction processing against the database 48 by executing the processing program 20.

In this case, the application server 30 collectively acquires data used for the transaction processing to the buffer memory 35. This aims at reducing the frequency of reading data from the database 48 by making the data cached in the buffer memory 35 to be read in response to access to the database 48 during transaction processing. The application server 30 sequentially accumulates data updated by the transaction processing in a writing cache 38 that collectively write back the data to the database 48 before a commit operation is performed. This aims at reducing the frequency of writing of data to the database 48 and thereby speeding up transaction processing.

FIG. 2 shows an example of the processing program 20. The program code on the first to twenty seventh lines indicates one batch processing as a whole. The program code on the third line indicates processing of opening an input stream and an output stream of the batch processing and generating a batch session bean, a bean for batch processing. The program code on the sixth line indicates processing of acquiring input data for the batch processing. The program code on the ninth to twenty fourth lines indicates the body of the transaction processing in the batch processing.

The program code on the eleventh line is a start processing portion indicating the start of the transaction processing. The program code on the fourteenth to nineteenth lines indicates an inner loop body obtained by dividing the batch processing with checkpoint operations as boundaries. The positions of checkpoints are not necessarily required to be statically determined in advance, and they may be dynamically determined from checkpoint candidates in accordance with administrative policies. That is, for example, during daytime operation in which the batch processing is performed in parallel with online processing, the interval between checkpoints may be set shorter in comparison with night time operation in which only the batch processing is performed.

The program code on the twenty first line indicates processing of calling a container service for checkpoints. The program code on the twenty third line is a commit operation portion indicating that the result of the transaction processing is committed to a database. The program code on the twenty sixth line indicates processing of releasing a storage area secured for the input and output streams used for the batch processing, batch session beans or the like from the memory.

FIG. 3 shows the features of the application server 30 classified into functional blocks. The application server 30 functions as a static analysis portion 32 for performing static analysis and thereby converting the processing program 20 to a processing inserted program 400, and an execution time processing portion 34 which is called by the processing inserted program 400 to perform processing when the batch processing is executed (immediately before execution, immediately after execution, or during execution). The static analysis portion 32 has a processing program acquisition section 300, a start processing detection section 310, a commit operation detection section 320, a target data selection section 330, an acquisition processing insertion section 340, a lifetime detection section 350, and a write back processing insertion section 360 and a data dependency determination section 370.

The processing program acquisition section 300 acquires the processing program 20. The start processing detection section 310 detects a start processing portion indicating the start of the transaction processing from the processing program 20. The commit operation detection section 320 detects a commit operation for the result of the transaction processing from the processing program 20. The target data selection section 330 selects at least one target data to be accessed by the transaction processing by the processing program 20, from the database 48. Specifically, the target data selection section 330 first identifies a program code between the start processing portion detected by the start processing detection section 310 and the commit operation portion detected by the commit operation detection section 320. Then, the start processing detection section 310 analyzes the program code and selects all the data that may be used in the program code as target data.

The acquisition processing insertion section 340 inserts target data acquisition processing for collectively acquiring target data from the database 48 and storing the target data in the buffer memory 35, into the portion to be executed after start of the transaction processing and before the first access to the target data in the processing program 20. For example, the acquisition processing insertion section 340 may insert the target data acquisition processing as processing to be executed next to the transaction start processing portion in the processing program 20.

The data dependency determination section 370 determines data dependency of the processing program 20, which is dependency of the transaction processing by the processing program 20 on target data updated during the transaction processing, and sends the determination result to the acquisition processing insertion section 340. If there is a possibility that the processing program 20 has the data dependency, then the acquisition processing insertion section 340 further inserts hash function generation processing for generating a hash function for determining, from identification information about target data, a storage location of the target data in the buffer memory 35, as the target data acquisition processing. Then, the acquisition processing insertion section 340 sends the processing program 20 in which the target data acquisition processing and the like have been inserted, to the lifetime detection section 350.

The lifetime detection section 350 detects a lifetime of each target data used by the processing program 20, and sends the processing program 20 as well as the detection result to the write back processing insertion section 360. The write back processing insertion section 360 inserts target data write back processing for writing back target data updated by the transaction processing among the target data to the database 48, into a portion to be executed after the last access to the target data and before commitment of the processing result in the processing program 20. For example, the write back processing insertion section 360 may insert the target data write back processing before the commit operation portion in the processing program 20 as processing to be executed immediately before the commit operation. The processing program in which the target data acquisition processing, the target data write back processing and the like have been inserted is referred to as a processing inserted program 400.

Furthermore, preferably, the write back processing insertion section 360 may insert into a portion to be executed after commitment of the processing result in the processing program 20, processing of invalidating the target data the lifetime of which has already ended in the portion, in the buffer memory 35, in addition to the target data write back processing. Thereby, the target data which will not be used in the subsequent processing can be removed from the buffer memory 35, and the storage area of the buffer memory 35 can be more effectively utilized.

When the processing inserted program 400 is executed, the processing by the execution time processing portion 34 is started. The execution time processing portion 34 has a target data acquisition processing section 380, a target data write back processing section 385, a hash function generation section 390 and a buffer writing section 395. The target data acquisition processing section 380 is executed after start of the transaction processing and before the first access to the target data to collectively acquire the target data from the database management system 40 and store them in the buffer memory 35. The target data write back processing section 385 is executed after termination of the transaction processing and before the commit operation. The target data write back processing section 385 collectively writes back the target data sequentially accumulated in the writing cache 38 to the database 48, if the processing program 20 does not have data dependency. On the other hand, if there is a possibility that the processing program 20 has data dependency, the target data write back processing section 385 performs processing of collectively writing back the target data updated in the buffer memory 35 to the database 48.

If there is a possibility that the processing program 20 has data dependency, the hash function generation section 390 and the buffer writing section 395 perform the following processing. The hash function generation section 390 generates a hash function based on an access pattern in which target data is accessed by the transaction processing by the processing program 20. For example, when the target acquisition processing is executed, the hash function generation section 390 may generate the hash function prior to start of the transaction processing. Then, every time the target data is updated during execution of the transaction processing by the processing program 20, the buffer writing section 395 writes the updated target data in the buffer memory 35. Thereby, it is possible to maintain the target data to be read from the buffer memory 35 by the subsequent transaction processing in an updated condition.

FIG. 4 shows an example of the processing inserted program 400. The processing inserted program 400 includes a portion of calling target data acquisition processing as the processing to be executed next to the start processing portion in the program (on the twelfth line). The processing inserted program 400 also includes a portion of calling the target data write back processing as the processing to be executed immediately before the commit operation portion in the program (on the twenty second line). Thereby, it is possible to collectively acquire data used for transaction processing to the buffer memory 35 and to collectively write back data updated by the transaction processing to the database 48 immediately before the commit operation.

FIG. 5 is a flowchart of a process to be statically performed by the application server 30 on the processing program 20. When acquiring the processing program 20 and deploying the processing program 20 in J2EE (S500) for example, the processing program acquisition section 300 performs the following process. The start processing detection section 310 detects a start processing portion indicating the start of the transaction processing from the processing program 20 (S510). The commit operation detection section 320 detects a commit operation portion indicating processing of committing the result of the transaction processing from the processing program 20 (S520).

The target data selection section 330 selects at least one target data to be accessed by the transaction processing by the processing program 20, from the database 48 (S530). Specifically, the target data selection section 330 first identifies a program code between the start processing portion detected by the start processing detection section 310 and the commit operation detected by the commit operation detection section 320. Then, the target data selection section 330 analyzes the program code and thereby generates a call graph of methods to be called by the program code. In generation of the graph, type analysis of source objects, class hierarchy analysis and the like are performed in order to identify targets of method invocations.

The target data selection section 330 scans the generated call graph and thereby determines how CMP entity beans or the results of JDBC access are used in each iteration of the loops within batch processing. Specifically, since an accessor method in which get or set is combined with a field name is used in a CMP bean, the target data selection section 330 can determine which field of which bean is to be accessed by detecting accessor methods. In case of direct database access with JDBC, the target data selection section 330 can determine which data is to be accessed by analyzing SQL statements specified by prepareStatement or access to its ResultSet.

The acquisition processing insertion section 340 inserts target data acquisition code for acquiring target data from the database 48 and storing it in the buffer memory 35, into the portion to be executed after start of transaction processing and before the first access to the target data in the processing program 20 (S540). Specifically, the acquisition processing insertion section 340 is assumed to treat data obtained by vectorizing multiple target data in this portion, and executes an SQL statement for collectively acquiring the vectorized data the number of times less than the number of the multiple target data. Furthermore, preferably, the acquisition processing insertion section 340 may determine whether or not the target data is read only data based on the program analysis performed by the target data selection section 330 and, if it is read only data, execute a predetermined SQL statements which does not require exclusive control and thus allow high speed processing.

The lifetime detection section 350 detects the lifetime of each target data used in the processing program 20 (S550). The write back processing insertion section 360 inserts target data write back code for writing back target data updated by the transaction processing among the target data to the database 48, into the portion to be executed after the last access to the target data and before commitment of the result of the transaction processing in the processing program 20 (S555). Furthermore, preferably, the write back processing insertion section 360 may insert into the portion to be executed after the target data write back processing and before commitment of the result in the processing program 20, processing of invalidating the target data the lifetime of which has already ended in the portion in the buffer memory 35, in addition to the target data write back processing.

The data dependency determination section 370 determines data dependency of the processing program 20, which is dependency of the transaction processing by the processing program 20 on target data updated during the transaction processing (S570). If the processing program 20 has the data dependency, the data dependency determination section 370 makes setting for enabling the processing by the hash function generation section 390 in the execution time processing portion 34 (S585), and makes setting for enabling the processing by the buffer writing section 395 (S590). The processing inserted program 400 in FIG. 4 is an example of having no data dependency, and therefore such settings are not made.

FIG. 6 is a flowchart of a process to be performed by the application server 30 at execution time based on the processing inserted program 400. The application server 30 reads input data to be used for transaction processing based on the processing inserted program 400 (S600; corresponding to the sixth line of FIG. 4). Next, the application server 30 performs start processing, which is initialization processing for starting the transaction processing (S605; corresponding to the eleventh line of FIG. 4).

Then, the target data acquisition processing section 380 acquires target data from the database 48 of the database management system 40 and stores it in the buffer memory 35 (S610; corresponding to the twelfth line of FIG. 4). Specifically, the target data acquisition processing section 380 dynamically generates an EJBQL (EJB Query Language) statement or an SQL statement for acquiring multiple target data as vector data based on information about a CMP bean or JDBC access identified by static analysis and input data inputted by the next commit operation. Various forms of treating multiple target data as vector data can be conceivable depending on input data, as shown below. Actually, a combination thereof is used.

(1) Specification by the range of key index (for example, SELECT . . . WHERE 0<=key and key<100).

(2) Specification by something other than key index (for example, SELECT . . . WHERE DepositAmount>100).

(3) Specification by arranging key index one by one (for example, SELECT . . . WHERE key=0 or key=10 or key=1000).

(4) Specification of a destination specified by CMR (container managed relationships) (for example SELECT . . . FROM Customer AS c, IN (c. accounts)).

Then, the application server 30 accesses the target data by use of the CMP bean (S620; corresponding to the processing called by the sixteenth line of FIG. 4). In this case, the access is made not to the database 48 but to the buffer memory 35. If the target data is updated as a result of the transaction processing, the application server 30 stores the updated result in the writing cache 38. As an example, by calling addBatch, an SQL provided for JDBC ver 2.0, it is possible to store the updated result in the writing cache 38. Then, the application server 30 reads the next input data (S630; corresponding to the processing on the eighteenth line of FIG. 4).

If a checkpoint condition is not satisfied (S640: No.), then the application server 30 returns the control to S620. On the other hand, if the checkpoint condition is satisfied (S640: YES), then the target data write back processing section 385 performs target data write back processing (S650; corresponding to the processing on the twenty second line of FIG. 4). Specifically, the target data write back processing section 385 performs vector type update processing for writing back target data updated during the transaction processing to the database 48 the number of times less than the number of the updated data which have been updated as vector data. Thereby, the transaction processing can be speeded up in comparison with the case of writing target data every time it is updated.

Then, the application server 30 performs processing of committing the result of the transaction processing (S660; corresponding to the processing on the twenty third line of FIG. 4). Preferably, the application server 30 may perform processing of invalidating the target data the lifetime of which has already ended at the time of commitment, in the buffer memory 35 (S670). Finally, the application server 30 determines whether or not a condition for terminating the batch processing is satisfied (S680). If the termination condition is satisfied (S680: YES), then the application server 30 terminates the batch processing. If the termination condition is not satisfied (S680: NO), then the application server 30 returns the control to S605 to perform the next transaction processing.

FIG. 7 shows a timing chart of processing to be performed by the application server 30 at execution time based on the processing inserted program 400. FIG. 7(*a*) shows processing based on the processing inserted program 400, while, FIG. 7(*b*) shows processing to be performed when the processing program 20 is executed without any change made therein, in contrast with FIG. 7(*a*). According to FIG. 7(*a*), vector type acquisition processing and vector type update processing are performed once before and after the iterations of the inner loop, respectively. In contrast, in FIG. 7(*b*), normal acquisition processing and update processing are always performed before and after each iteration of the inner loop. As apparent from the figures, according to the application server 30 in this embodiment, it is possible to significantly speed up transaction processing by reducing the frequency of accessing the database 48.

Then, description will be made in the case where there is a possibility that the processing program 20 may have data dependency, by using FIGS. 8 to 11.

FIG. 8 shows another example of the processing program 20. FIG. 8(*a*) shows a program code of the processing program 20, and FIG. 8(*b*) shows input data to be inputted in the program code. The program code on the first to twenty sixth lines indicates one batch processing as a whole. The program code on the third line indicates processing of acquiring input data for batch processing. The program code on the sixth to twenty fifth lines indicates the body of transaction processing in the batch processing.

The program code on the eighth line is a start processing portion indicating the start of the transaction processing. The program code on the eleventh to twentieth lines indicates an inner loop body obtained by dividing the batch processing with checkpoint operations as boundaries. The program code on the twenty second line indicates processing invoking a container service for checkpoints. The program code on the twenty fourth line is a commit operation portion indicating processing of committing the result of the transaction processing.

This program code indicates processing of transferring the specified amount from an account specified by customerAId to an account specified by customerBId. Specifically, the message on the first line of the input data is read first by the program code on the third line. Then, the home interface account_home is accessed by the program code on the thirteenth line with the value of customerAId as a primary key. As a result, a CMP bean indicating the account specified by customerAId is activated.

Similarly, the home interface account_home is accessed by the program code on the fourteenth line with the value of customerBId as a primary key, and as a result, a CMP bean indicating the account specified by customerBId is activated. These activated beans are referred to as account beans. These beans include data indicating balance as well as a method for acquiring balance (getBalance) and a method for setting balance (setBalance).

Then, a value obtained by subtracting a specified amount to be transferred from the balance of customerAId is set as a new balance of customerAId by the program code on the sixteenth line. A value obtained by adding the transfer amount to the balance of customerBId is set as a new balance of customerBId by the program code on the seventeenth line. Finally, input data to be processed next is read by the program code on the nineteenth line, and the control is returned to the eleventh line.

In this way, in the inner loop body, an amount of money is transferred between accounts specified by input data every time the loop iterates. Each account is accessed by the same interface (account_home), and two primary keys (specifically, customerAId and customerBId) indicating a source and a destination of the transfer operation, respectively, are used. Therefore, it is impossible to determine that the program does not have data dependency by analyzing the program code. Actually, according to the input data in FIG. 8(*b*), the destination account specified by customerBId on the first line is specified as the source account by customerAId on the third line, and thus data dependency has occurred.

FIG. 9 shows the processing program 20 in which processings have been inserted. Target data acquisition processing is inserted in the portion to be executed next to the start processing portion indicating the start of transaction processing. Furthermore, target data write back processing is inserted in the portion to be executed immediately before the commit operation for committing the result of the transaction processing.

FIG. 10 is a flowchart of a process to be performed by the application server 30 at execution time in this embodiment. The application server 30 reads input data to be used for transaction processing (S700; corresponding to the third line of FIG. 9). Next, the application server 30 performs the start processing, which is initialization processing for starting the transaction processing (S705; corresponding to the eighth line of FIG. 9).

Then, the target data acquisition processing section 380 acquires target data from the database 48 of the database management system 40 and stores it in the buffer memory 35 (S710: corresponding to the ninth line of FIG. 9). In this case, the target data acquisition processing section 380 is assumed to treat data obtained by vectorizing multiple target data, and acquires the vectorized data with the number of database accessing time less than the number of the multiple target data. Thereby, the transaction processing can be speeded up in comparison with the case of reading target data every time it is needed.

Since there is a possibility that the processing program 20 has data dependency, the hash function generation section 390 generates a hash function 800 based on an access pattern in which the target data is accessed by the transaction processing by the processing program 20 (S715; within the processing on the ninth line of FIG. 9). Then, the application server 30 accesses the target data with the use of a CMP bean A and a CMP bean B (S720; corresponding to the processing on the thirteenth to seventeenth lines of FIG. 4).

Every time the target data is updated during execution of the transaction processing by the processing program 20, the buffer writing section 395 writes the updated target data in the buffer memory 35 (S730; within the processing on the sixteenth to seventeenth lines of FIG. 9). For example, with identification information about the updated target data as a key, the buffer writing section 395 determines a storage location where the target data is to be stored in the buffer memory 35, by the hash function 800, and updates the target data stored at the storage location in the buffer memory 35.

If a checkpoint condition is not satisfied (S740: NO), then the application server 30 returns the control to S720. On the contrary, if the checkpoint condition is satisfied (S740=YES), then the target data write back processing section 385 performs target data write back processing (S750; corresponding to the processing on the twenty third line of FIG. 9). Specifically, the target data write back processing section 385 selects the updated target data from the buffer memory 35, and stores each of the selected target data in the writing cache 38. For example, the target data write back processing section 385 may execute addBatch of JDBC for each of the updated target data. Then, the target data write back processing section 385 performs processing of collectively writing back the target data stored in the writing cache 38 to the database 48. As an example, the target data write back processing section 385 may execute executeBatch of JDBC. Then, the application server 30 performs processing of committing the result of the transaction processing (S760; corresponding to the processing on the twenty fourth line of FIG. 9). Finally, the application server 30 determines whether or not a termination condition for terminating the batch processing is satisfied (S770). If the termination condition is satisfied (S770: YES), then the application server 30 terminates the batch processing. If the termination processing is not satisfied (S770: NO), then the application server 30 returns the control to S705, and performs the next transaction processing.

FIG. 11 shows the details of processing of the application server 30 manipulating target data with the use of the processing program acquisition section 300. Since there is a possibility that the processing program 20 has data dependency, the hash function generation section 390 generates a hash function 800 based on an access pattern in which the target data is accessed by the transaction processing by the processing program 20. For example, if identification information is a numeric value and multiple target data with continuous numeric values are sequentially accessed, a hash function with lower order digits of the identification information used as a hash key may be generated. Thereby, it is possible to prevent hash keys from conflicting with each other and improve efficiency of access to target data.

Immediately before the transaction processing, the target data acquisition processing section 380 determines, with at least a part of identification information about each of acquired target data as a hash key, a storage location where the target data is to be stored in the buffer memory 35, by the hash function 800. Then, the target data acquisition processing section 380 stores the target data at the storage location.

Then, if the target data is updated during execution of the transaction processing by the processing program 20, the buffer writing section 395 determines the storage location where the target data is stored in the buffer memory 35, by the hash function 800, with at least a part of the identification information about the target data as a hash key. Then, the buffer writing section 395 updates the target data stored at the storage location in the buffer memory 35, and stores information indicating that the target data has been updated in association with the target data.

Thus, even if it is unknown whether data dependency exists or not and it is required to dynamically update the buffer memory 35, it is possible to improve efficiency of the transaction processing by effectively using a hash function. Furthermore, if it is possible to identify an access pattern in which target data is accessed, efficiency of the processing can be further improved by avoiding conflicts of hash keys.

FIG. 12 shows an example of the hardware configuration of the application server 30. The application server 30 is provided with a CPU peripheral part having a CPU 1000, a RAM 1020 and a graphic controller 1075 which are mutually connected via a host controller 1082; an input/output part having a communication interface 1030, a hard disk drive 1040 and a CD ROM drive 1060 which are connected to the host controller 1082 by an input/output controller 1084; and a legacy input/output part having a ROM 1010, a flexible disk drive 1050 and an input/output chip 1070 which are connected to the input/output controller 1084.

The host controller 1082 connects the RAM 1020 to the CPU 1000 and the graphic controller 1075 which access the RAM 1020 at a high transfer rate. The CPU 1000 operates based on programs stored in the ROM 1010 and the RAM 1020 and controls each part. The graphic controller 1075 acquires image data generated by the CPU 1000 or the like on a frame buffer provided in the RAM 1020 and displays it on a display device 1080. Instead, the graphic controller 1075 may include the frame buffer for storing image data generated by the CPU 1000 or the like therein.

The input/output controller 1084 connects the host controller 1082 to the communication interface 1030, the hard disk drive 1040 and the CD ROM drive 1060 which are relatively high speed input/output devices. The communication interface 1030 performs communication with an external apparatus via a network. The hard disk drive 1040 stores programs and data to be used by the application server 30. The CD ROM drive 1060 reads a program or data from a CD ROM 1095, and supplies it to the input/output chip 1070 via the RAM 1020.

To the input/output controller 1084, the ROM 1010 and relatively low speed input/output devices such as the flexible disk drive 1050 and the input/output chip 1070 are connected. In the ROM 1010, there are stored a boot program to be executed by the CPU 1000 when the application server 30 is activated or programs dependent on the hardware of the application server 30. The flexible disk drive 1050 reads a program or data from a flexible disk 1090, and supplies it to the input/output chip 1070 via the RAM 1020. The input/output chip 1070 connects the flexible disk 1090 or various input/ output input devices via a parallel port, a serial port, a keyboard port or a mouse port, for example.

Programs supplied to the application server 30 are stored in a recording medium such as the flexible disk 1090, the CD ROM 1095 and an IC card, and provided by a user. A program is read from the recording medium via the input/output chip 1070 and/or the input/output controller 1084, installed in the application server 30 and executed. The operations that the program causes the application server 30 to operate are the same as those by the application server 30 described through FIGS. 1 to 11, and therefore description thereof will be omitted.

The program described above may be stored in an external storage medium. As the storage medium, an optical recording medium such as a DVD and PD, a magneto optic recording medium such as an MD, a tape medium, a semiconductor memory such as an IC card and the like may be used, in addition to the flexible disk 1090 and the CD ROM 1095. A storage device such as a hard disk or a RAM provided in a server system connected to a dedicated communication network or the Internet may be used as a recording medium to provide the program to the application server 30 via the network.

FIG. 13 shows the outline of an experiment illustrating the effect of this embodiment. FIG. 14 shows the processing program 20 used in the experiment illustrating the effect of this embodiment. As the experiment environment, a DB2 system of IBM Corporation is used as the database 48, and a Cloudscape is used as the buffer memory 35. Here, Cloudscape is a Java® based program which performs the same operations as that of a database in the same process as that of an application server, using memory as a storage area instead of a hard disk and the like. Comparison is made among the first case where optimization with the use of the buffer memory 35 is not applied, the second case where target data is acquired to the buffer memory 35 prior to transaction processing and the third case where target data is acquired as a Java® object prior to transaction processing.

The second case corresponds to this embodiment. The third case does not require even processing of controlling a buffer memory and, therefore, shows the upper limit of improvement of efficiency of the transaction processing.

For each of the above cases, a processing program performing the same processing is executed to measure required time. The processing program 20 shown in FIG. 14 shows a program example of the second case. Specifically, an operation is executed in an inner loop that one entry of target data is read from the database 48, the buffer memory 35 or the like, and predefined calculation is performed to update the target data. In an outer loop, operation of committing the updated data is performed.

As a result of this experiment, in the second case, performance improvement is confirmed to be 2.2 times as high as that of the case where optimization is not applied. In the third case, performance improvement is confirmed to be about 15 times as high as that of the case where optimization is not applied. From this, it is expected that performance can be further improved by caching target data in the buffer memory 35 as Java® objects instead of using Cloudscape.

The present invention has been described with the use of an example embodiment. However, the technical scope of the present invention is not limited to the scope described in the embodiment. It is apparent to one skilled in the art that various changes and improvements can be made in the above described embodiment. It is apparent from description of the Claims that embodiments in which such changes or improvements have been made can be also included in the technical scope of the present invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system or in a distributed fashion where different elements are spread across several interconnected computer systems. Any kind of computer system or other apparatus adapted for carrying out the methods and/or functions described herein is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information processing system comprising:
physical and tangible means for performing transaction processing against a database, said transaction processing encompassing interaction as well as processing setup required and including moving items into a buffer cache prior to database access, the information processing system further comprising:
a processing program acquisition section for acquiring a processing program in which the transaction processing against a database is described;
a target data selection section for selecting from the database at least one target data to be accessed by the transaction processing of the processing program;
a write-back processing insertion section for inserting target-data write-back processing for writing back to the database target data which has been updated by the transaction processing among the target data, into a part of the processing program which is to be executed after the target data is accessed last and before a result of the transaction processing is committed;
a commit operation detection section for detecting a commit operation portion indicating processing of committing a result of transaction processing of the processing program; wherein
the write-back processing insertion section inserts the target-data write-back processing before the commit operation portion detected by the commit operation detection section in the processing program is inserted, as processing to be executed immediately before a commit operation, and further comprising:
a buffer memory in which at least a part of data in the database is cached and from which the cached data is read in response to access to the database; and
an acquisition processing insertion section for inserting target-data acquisition processing for collectively acquiring the target data from the database and storing the target data in the buffer memory, into a portion to be executed after the transaction processing is started and before the target data is accessed;
a start processing detection section for detecting a start processing portion indicating the start of transaction processing, out of the processing program; wherein
the acquisition processing insertion section inserts the target-data acquisition processing as processing to be executed next to the start processing portion in the processing program;
a data-dependency determination section for determining data dependency of the processing program, which is a dependency of the transaction processing by the processing program on the target data updated during the execution of the transaction processing;
wherein
if the processing program does not have the data dependency,
the acquisition processing insertion section causes the target data to be read out of the buffer memory in the transaction processing of the processing program, by inserting the target-data acquisition processing; and
the write-back processing insertion section inserts processing for collectively writing back to the database target data updated by the transaction processing of the processing program, irrespective of the contents of the buffer memory; and
further comprising:
a buffer writing section for, every time the target data is updated during the execution of the transaction processing of the processing program, writing the updated target data in the buffer memory, if there is a possibility that the processing program has the data dependency;
a hash function generation section for generating a hash function based on an access pattern in which the target data is accessed by the transaction processing of the processing program, if there is a possibility that the processing program has the data dependency; wherein
the acquisition processing insertion section further inserts processing of determining, with at least a part of identification information about each of the acquired target data as a hash key, a storage location at which the target data is to be stored in the buffer memory with the use of the hash function, and storing the target data at the storage location, as the target-data acquisition processing; and
if target data is updated during the execution of the transaction processing of the processing program, the buffer writing section determines, with at least a part of identification information about the target data as a hash key, a storage location at which the target data is stored in the buffer memory with the use of the hash function, and updates the target data stored at the storage location in the buffer memory; and
further comprising a lifetime detection section for detecting a lifetime of each target data used in the processing program; wherein
the write-back processing insertion section inserts, into a portion to be executed after the result of the processing program is committed, processing of invalidating target data, the lifetime of which has already ended in the portion, in the buffer memory, and
the acquisition processing insertion section inserts processing of vectorizing the multiple target data and acquiring the vectorized data with the number of database accessing times less than the number of the multiple target data, as the target-data acquisition processing.

2. A computer program product embodied in a physical and tangible medium comprising a computer readable medium having computer readable program code embodied therein for causing functions of an information processing system for performing transaction processing against a database, the computer readable program code in said computer program product comprising program code for causing a computer to effect the functions of:
physical and tangible means for performing transaction processing against a database, said transaction processing encompassing interaction as well as processing setup required and including moving items into a buffer cache prior to database access, the information processing system further comprising:
a processing program acquisition section for acquiring a processing program in which the transaction processing against a database is described;
a target data selection section for selecting from the database at least one target data to be accessed by the transaction processing of the processing program;

a write-back processing insertion section for inserting target-data write-back processing for writing back to the database target data which has been updated by the transaction processing among the target data, into a part of the processing program which is to be executed after the target data is accessed last and before a result of the transaction processing is committed;

a commit operation detection section for detecting a commit operation portion indicating processing of committing a result of transaction processing of the processing program; wherein the write-back processing insertion section inserts the target-data write-back processing before the commit operation portion detected by the commit operation detection section in the processing program is inserted, as processing to be executed immediately before a commit operation, and further comprising:

a buffer memory in which at least a part of data in the database is cached and from which the cached data is read in response to access to the database; and an acquisition processing insertion section for inserting target-data acquisition processing for collectively acquiring the target data from the database and storing the target data in the buffer memory, into a portion to be executed after the transaction processing is started and before the target data is accessed;

a start processing detection section for detecting a start processing portion indicating the start of transaction processing, out of the processing program; wherein the acquisition processing insertion section inserts the target-data acquisition processing as processing to be executed next to the start processing portion in the processing program;

a data-dependency determination section for determining data dependency of the processing program, which is a dependency of the transaction processing by the processing program on the target data updated during the execution of the transaction processing; wherein if the processing program does not have the data dependency, the acquisition processing insertion section causes the target data to be read out of the buffer memory in the transaction processing of the processing program, by inserting the target-data acquisition processing; and the write-back processing insertion section inserts processing for collectively writing back to the database target data updated by the transaction processing of the processing program, irrespective of the contents of the buffer memory; and further comprising:

a buffer writing section for, every time the target data is updated during the execution of the transaction processing of the processing program, writing the updated target data in the buffer memory, if there is a possibility that the processing program has the data dependency;

a hash function generation section for generating a hash function based on an access pattern in which the target data is accessed by the transaction processing of the processing program, if there is a possibility that the processing program has the data dependency; wherein the acquisition processing insertion section further inserts processing of determining, with at least a part of identification information about each of the acquired target data as a hash key, a storage location at which the target data is to be stored in the buffer memory with the use of the hash function, and storing the target data at the storage location, as the target-data acquisition processing; and if target data is updated during the execution of the transaction processing of the processing program, the buffer writing section determines, with at least a part of identification information about the target data as a hash key, a storage location at which the target data is stored in the buffer memory with the use of the hash function, and updates the target data stored at the storage location in the buffer memory; and further comprising a lifetime detection section for detecting a lifetime of each target data used in the processing program; wherein the write-back processing insertion section inserts, into a portion to be executed after the result of the processing program is committed, processing of invalidating target data, the lifetime of which has already ended in the portion, in the buffer memory, and the acquisition processing insertion section inserts processing of vectorizing the multiple target data and acquiring the vectorized data with the number of database accessing times less than the number of the multiple target data, as the target-data acquisition processing.

* * * * *